United States Patent [19]

Silberring

[11] Patent Number: 5,019,356

[45] Date of Patent: May 28, 1991

[54] STEAM REFORMER WITH INTERNAL HEAT RECOVERY

[76] Inventor: Ludwig Silberring, Winzerhalde 30, CH-8049 Zurich, Switzerland

[21] Appl. No.: 155,726

[22] PCT Filed: May 23, 1986

[86] PCT No.: PCT/EP87/00240

§ 371 Date: Jan. 22, 1988

§ 102(e) Date: Jan. 22, 1988

[87] PCT Pub. No.: WO87/07247

PCT Pub. Date: Dec. 3, 1987

[30] Foreign Application Priority Data

May 23, 1986 [CH] Switzerland ............... 2090/86

[51] Int. Cl.$^5$ ............... B01J 8/04; F28D 1/00
[52] U.S. Cl. ............... 422/191; 422/148; 422/192; 422/193; 422/194; 422/198; 422/200
[58] Field of Search ............... 422/148, 191, 192, 193, 422/194, 195, 198-200, 201, 204, 205

[56] References Cited

U.S. PATENT DOCUMENTS

| | | | |
|---|---|---|---|
| Re. 19,243 | 7/1934 | Richardson | 422/191 X |
| 3,440,021 | 4/1969 | Niedetsky et al. | 422/191 X |
| 3,751,228 | 8/1973 | Semenov | 422/191 |
| 3,932,139 | 1/1976 | Vilceanu et al. | 422/191 X |
| 4,405,562 | 9/1983 | Zardi et al. | 422/191 X |
| 4,650,651 | 3/1987 | Fuderer | 422/191 |
| 4,731,098 | 3/1988 | Marsch | 422/197 X |
| 4,741,885 | 3/1988 | Herbort et al. | 422/197 |

FOREIGN PATENT DOCUMENTS 866085 4/1981 United Kingdom .

OTHER PUBLICATIONS

John H. Perry, Chemical Engineer' Handbook, Chemical Engineering Series, 1950, p. 350.

Norbert A. Lange, PhD., Handbood of Chemistry, 1961, pp. 1578-1579.

Primary Examiner—Robert J. Warden
Assistant Examiner—Amalia L. Santiago
Attorney, Agent, or Firm—Cushman, Darby & Cushman

[57] ABSTRACT

The inventive apparatus for the execution of endothermic reactions between gaseous reactants at heightened temperture and increased pressure encompasses the following main components:

an inner isolating hull (33) for conveying the feed substances from their inlet (E) along the clearance between the pressure wall (31) of the apparatus and the hull, a tube-bundle heat exchanger (39'), placed within the hull for the internal heat recovery, whereby the feed substances are outside of the tubes (39) of the heat exchanger, a catalyst material, disposed in the lower part of the heat exchanger and/or after it in flowing direction.

heating means (37, 37") arranged within the catalyst material for the supply of heat energy to the reactants at the region of the final conversion, whereby the reaction products proceed inside of the tubes, with heat delivery to the entering feed substances to the outlet of the apparatus.

Processes for producing a hydrogen-rich gas may be carred out by using an apparatus as indicated. For that the necessary amount of feed substances in form of steam and hydrocarbons and the necessary heat-energy in form of electrical energy and/or oxygen-containing gas for the partial oxydation of the reducing components in the feed substances are fed into said apparatus and the hydrogen-rich reaction products are withdrawn therefrom.

Such processes are useful for the production of the feed stock to be used in the $NH_3$— and/or $CH_3OH$-synthesis.

5 Claims, 6 Drawing Sheets

STEAM REFORMER WITH INTERNAL HEAT RECOVERY

The presently described invention provides an apparatus for the execution of endothermic catalyzed reactions between gaseous reactants at heightened temperature and increased pressure, with internal heat recovery and energy supply. The invention further describes a process for producing a hydrogen-rich gas by utilizing the apparatus. The $H_2$-gas obtained may be used in $NH_3$-and/or $CH_3OH$-synthesis.

The process carried out in the inventive apparatus is known per se. It is the catalyzed reaction of hydrocarbons and steam at temperatures of over 850 K and at increased pressure to a gas mixture containing hydrogen and carbon monoxide, the process is known as "steam reforming".

The reaction may be represented by the general formula:

$$C_nH_m + a\ H_2O + b\ O_2 \rightleftharpoons c\ H_2 + d\ CO + e\ CO_2 + \ldots$$

The conversion is, over wide temperature- and component-limits, endothermic, i.e. for the attainment of a high yield, heat-energy has to be supplied from outside.

In most of the known steam reformers the feed substances are fed into tubes filled with catalytic material. The tubes are arranged in a furnace and are heated by direct flame-firing through a number of burners.

As actual heat-recovery from reaction products to feed substances within the furnace is neither foreseen nor realized in known steam reformers.

Steam reformers with elecrical heating are also known:

GB patent No. 866 085 teaches a process for the decomposition of hydrocarbons under addition of stream to hydrogen and carbon monoxide. According to the GB patent steam of about 383 k is produced in boiler 5 by utilizing the heat-energy from an exothermic, external reaction. The steam is heated by heat exchange to about 673 K and mixed with hydrocarbon-vapours and/or -gases of the same temperature.

This mixture is then fed into reactor 4 and heated to reaction temperature (about 1223 K) by means of electrical induction heating. The hot reaction products are then used, outside the reactor 4 in a special heat exchanger, to produce the above mentioned steam.

The heat energy is added, as shown before, at low temperature levels. The plant to implement the above conversions encompasses at least three apparatus:

the reaction chamber 4, wherein no heat exchange or heat from reaction products to feed compounds occurs, the boiler 5, wherein the product gases give off heat-energy for the evaporation of water and for the heating of steam to about 383 K and the superheater 6, in which the steam from boiler 5 is heated to higher temperatures.

The plant consisting of different and separated apparatus, it is evident that, compared to an all-in-one-apparatus, it must be of a much more complex construction.

The reforming furnace according to DE Offenlegungsschrift No. 2 809 126 utilizes the heat-energy in the cooling medium of a High Temperature Helium Cooled Reactor (HTHR) and, additionally, electrical heat, to convert gaseous hydrocarbons and steam to hydrogen and carbon oxides, The structure is suited for high temperature but not for elevated pressure (compensators for dilatation, exchangeable containers for catalysts).

EP, Publ. No. 0 020 358, teaches an ordinary electro-reformer, with a reactor having an inside thermal isolation and the catalyst placed in the tubes. In the same tubes within, the catalytic mass, are placed the electric heating elements.

In clear technical distinction therefrom the inventive apparatus shows a stream reformer with inner cooling of the container wall by the feed substances, with internal heat recovery and with thermodynamically and process-technologically advantageous arrangements of the catalyst and the heating device. All components can be installed in a pressure vessel, which allows the process to proceed at elevated pressure, a very important requirement in the hydrogen-technology. The heating element can be an electrical heating device or a burner.

The process for obtaining hydrogen-rich gas, carried out in the inventive apparatus, may be adapted to a wide range of feed substances, i.e. to different hydrocarbons, air, air-oxygen mixtures; further the different reactions are easily controlled.

The apparatus for the execution of endothermic reactions between gaseous reactants at heightened temperature and increased pressure, with internal heat recovery from reaction products to feed substances, with catalysis and heat supply, according to this invention, is characterized by and inner isolating hull 13 for coveying the feed substances from their inlet along the clearance between the pressure wall of the apparatus and said hull, a tube-bundle heat exchanger, placed within said hull for the internal heat recovery, whereby the feed substances are outside of the tubes of said heat exchanger, a catalyst material, disposed in the lower part of said heat exchanger and/or after it in flowing direction, heating means arranged in the region of the catalyst material for the supply of heat energy to the reactants at the point of the final conversion, whereby the reaction products proceed inside of the tubes with heat delivery to the entering feed substances to the outlet of the apparatus and the arrangement of all parts within a pressure vessel.

A first special embodiment of the above apparatus is further characterized in that the heating means is a burner, to which oxygen-containing gas is conveyed from outside— and with heat exchange —, which gas is exothermically reacted with a part of the reducing feed substances, whereby the burner is placed between the catalytic material, here arranged in two blocks 15, 15'.

As second special embodiment of the inventive apparatus is further characterized in that the heating means is an electrical heater and in that the heating elements are arranged in the lower part of the region with the catalytic material, outside the tubes of the heat exchanger.

A third form of the general apparatus is further characterized in that the heating means is combined device of electrical heating elements and of a burner, both components being operated separately and independently, whereby the heating means is arranged within the lower part of the upper block of catalytic material and outside of the tubes of the heat exchanger.

All apparatus show an inner isolating hull or metallic and/or ceramic material(s) and the pressure vessel has an outside thermal isolation.

In the first special embodiment the catalytic material is arranged in two parts, the first one being material positioned as layers in baskets outside the tubes of the heat exchanger and the second one being material placed in the passage of the reactants after the burner, whereby the reactants flow through both said catalyst material blocks and the burner is an injector arrangement for mixing the oxygen-containing gas into the reducing gaseous reactants after it rise in temperature by heat recovery, whereby—after the further heating of the reactants by the exothermic reaction with the oxygen-containing gas—, the reactants enter the second block of catalytic material.

In the second form of the inventive apparatus the catalytic material is arranged as layers within baskets outside the tubes of the heat exchanger through which layers the feed compounds flow in more than one passage and the electric heating elements are arranged in the lower region of the baskets with catalytic material but separated therefrom and also outside the tubes of the heat exchanger.

In the third form of the apparatus the catalytic material is arranged in two parts the first one being material positioned as layers in baskets outside the tubes of the heat exchanger and the second one being material placed in the passage of the reactants after the burner, whereby the reactants flow through both the catalyst material blocks, the electric heating elements are arranged in the lower region of the baskets with catalytic material but separated therefrom and also outside the tubes of the heat exchanger and the burner is an injector arrangement for mixing the oxygen-containing gas into the reducing gaseous reactants after it rise in temperature by heat recovery, whereby—after the further heating of the reactants by the exothermic reaction with the oxygen-containing gas—the reactants enter the the second block of catalytic material.

For implementing the process for producing a hydrogen-rich gas by using the inventive apparatus the necessary amount of feed substances in form of stream and hydrocarbons and the necessary heat-energy in form of electrical energy and/or oxygen-containing gas for the partial oxydation of the reducing components in the feed substances are fed into the apparatus and the hydrogen-rich reaction products are withdrawn. The process may serve as the basis for the production of the feed stock to be used in the $NH_3$- and/or $CH_3OH$-synthesis.

The inventive reactor will now be exemplified by means of three special embodiments. These are the steam reformer with burner (FIG. 1), the steam reformer with electrical heating (FIG. 2) and the stream reformer with a combined burner-electrical heating (FIG. 3).

Figure 1:
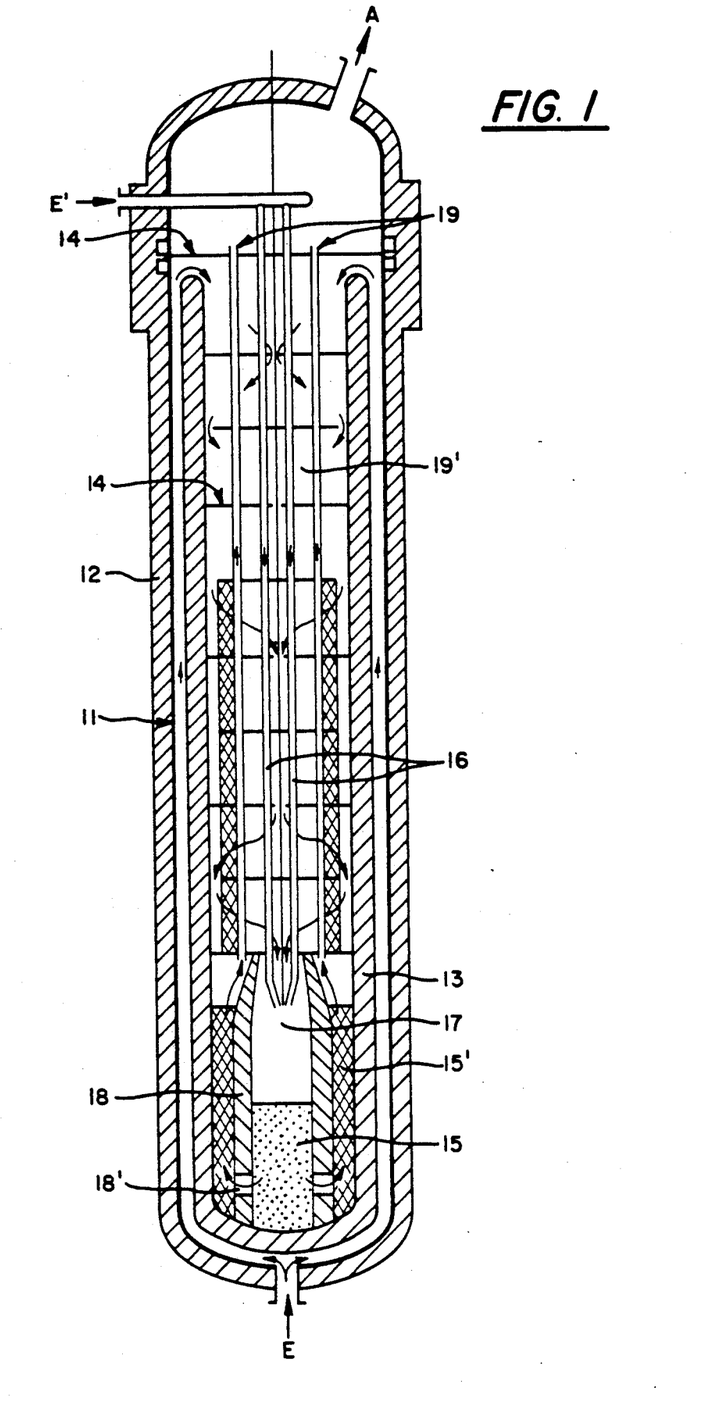

FIG. I illustrates a inventive apparatus according to the present invention.

E is the inlet for the feed substances, i.e. substantially gaseous and/or vaporized hydrocarbons and steam in an appropriate proportion. E' is the inlet for the oxygen containing gas, i.e. air or oxygen-enriched air; steam may be added here too. Through the outlet A the gaseous reaction products leave the apparatus.

After entrance the feed substances flow within the clearance between the vessel wall 11 and the inner thermal isoltion hull 13 along practically the whole height of the apparatus. Directed by deflector plates 14 the gaseous feed substances flow around and outside the tubes 19 of the heat exchanger 19'. Starting from a predetermined height, the flow continues, but now within the layers of catalytic material (first block). The gases having been heated (mainly by the previous heat exchange) the reaction will start immediately after contact of the reactants with catalyst. After a certain degree of conversion the gases enter the region 17, where oxygen-containing gas is passed in, after having been heated within the special tubes 16. A predetermined part of the reducing species in the feed substances is now burned with the introduced oxygen, whereby the reaction of the gases is raised to a reaction optimum level. In the second catalyst-block, consisting of the elements 15 and 15' the reforming conversion is brought to the equilibrium and the gaseous reaction products leave through the tubes 19 and outlet A. Thereby they give off heat-energy to the entering reactants and (indirectly) also to the entering oxygen-containing gases.

Figure 2:
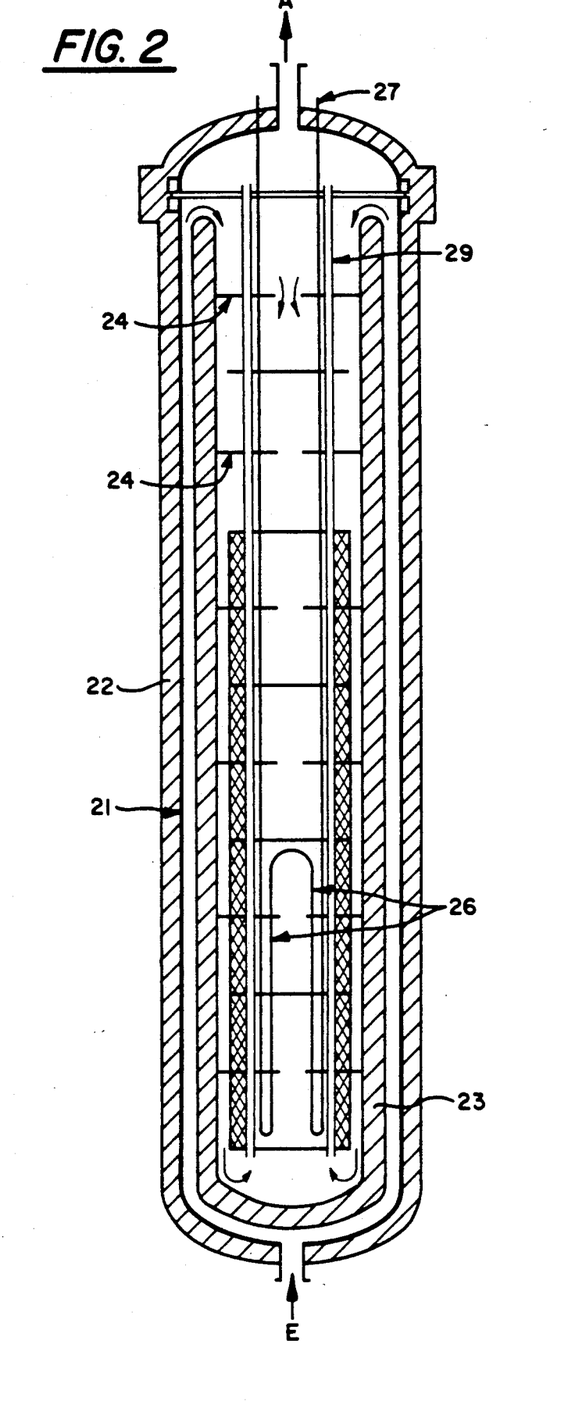

FIG. 2 shows a second special embodiment; of the present invention.

E stands here also for the inlet of the gaseous feed substances and A for the outlet of the gaseous reaction products. The components numerated with 21, 22, 23, 24 and 29 correspond to those with 11, 12, 13, 14 and 19 in FIG. 1. 26 is the electrical heating element which is fixed outside the tubes and separated from the catalyst. The electrical wires are designated with 27.

Figure 3:
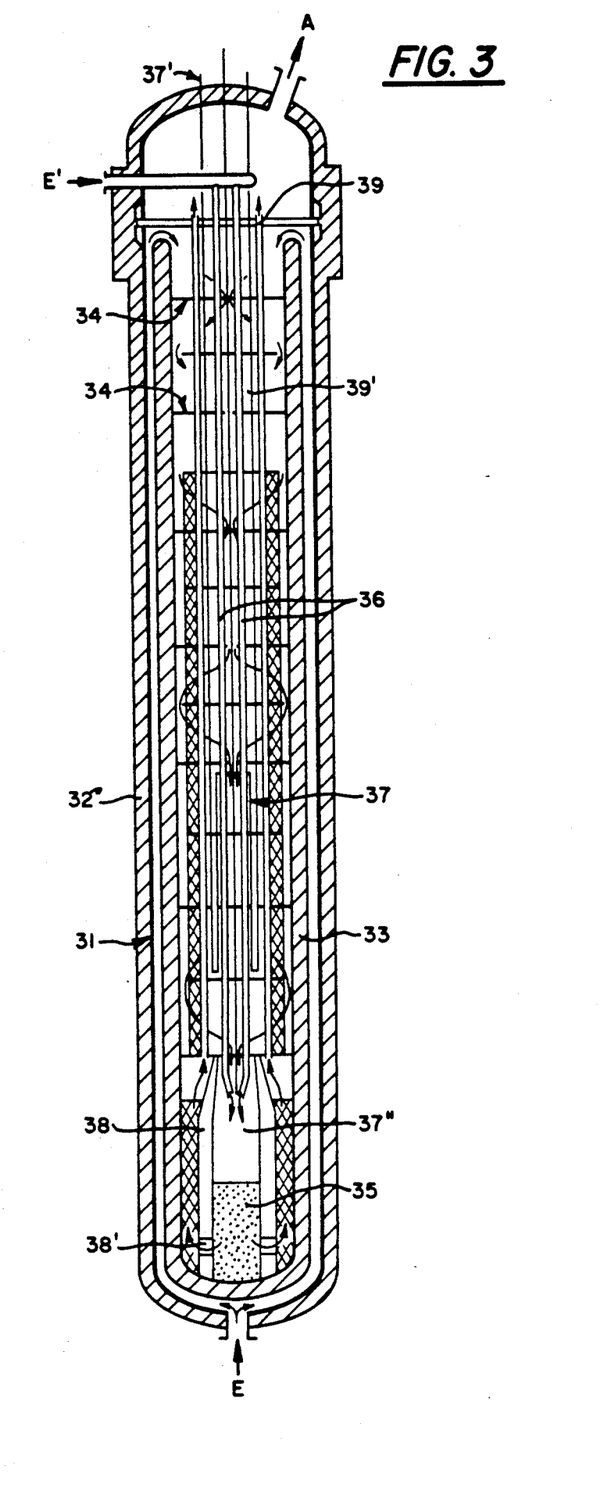

In FIG. 3 a third special embodiment of the invention is illustrated.

E is the inlet for the feed substances, E' the one for the oxygen-containing gas plus if necessary steam. With A is designated the outlet for the gaseous reaction products, i.e. the hydrogen containing gas.

After entrance the feed substances flow within the clearance between the vessel wall 31 (with outer insulation 32) and the inner thermal isolation hull 33 along practically the whole height of the apparatus. Directed by deflector plates 34 the gaseous feed substances flow around and outside the tubes 39 of the heat exchanger 39. Starting from a predetermined height, flow continues, but now within the layers of catalytic material (first block). The gases having been heated (mainly by the previous heat exchange) the reaction will start immediately after contact of the reactants with the catalyst. After a certain degree of conversion and with being heated by the electrical heating elements 37 with wires 37', the gases enter the region 37, where oxygen-containing gas is passed in, after having been heated within the special tubes 36. A predetermined part of the reducing species in the feed substances is now burned with the introduced oxygen, whereby the reaction of the gases is raised to a reaction optimum level. In the second catalyst-block, consisting of the elements 35 and 35' the reforming conversion is brought to the equilibrium and the gaseous reaction products leave through the tubes 39 and outlet A. Thereby they give off heat-energy to the entering reactants and (indirectly) also to the entering oxygen-containing gases.

Figure 4:
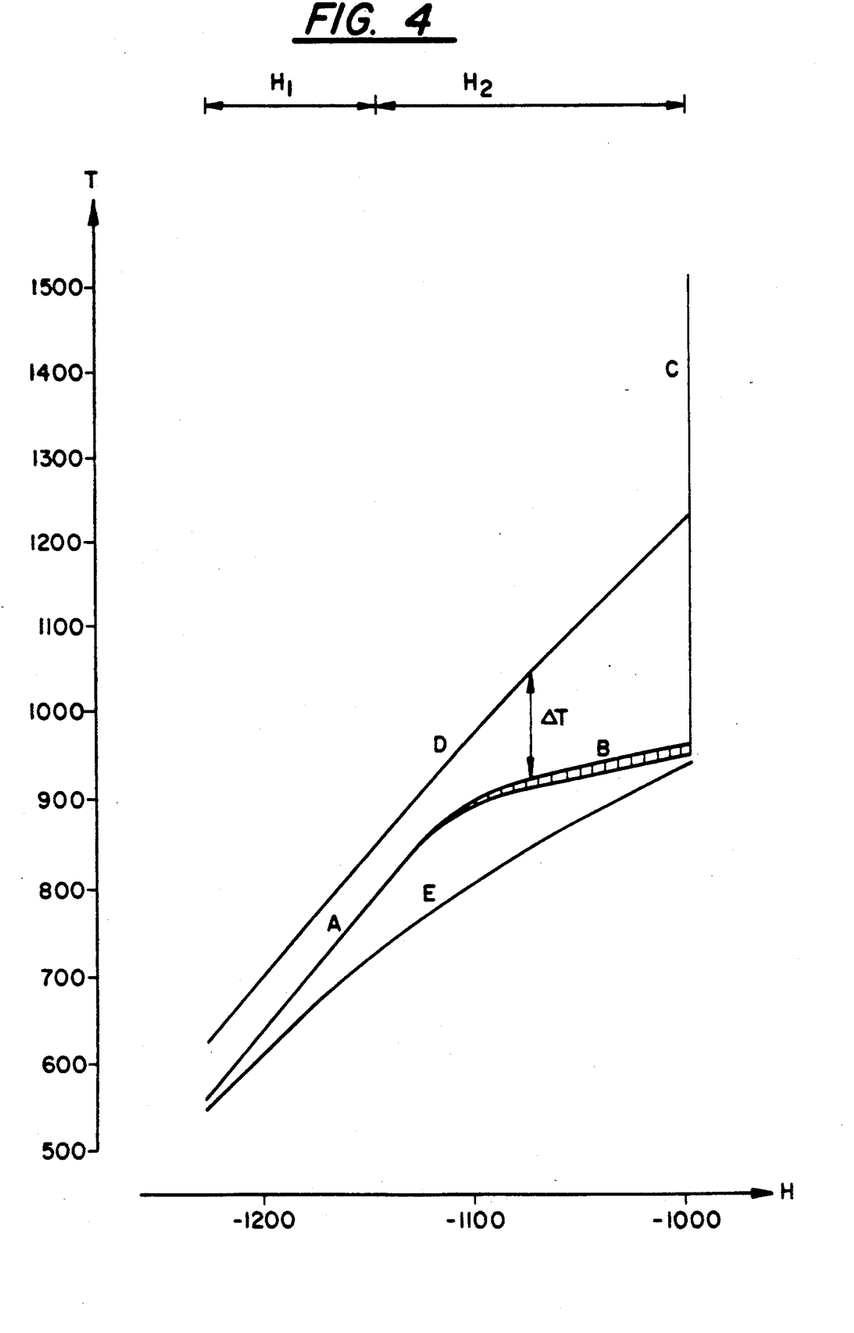
In FIGS. 4 to 6 finally, some important thermodynamical relations of the processes carried out in the inventive apparatus are given; these graphical representations are to be read in relation with the tables I to III, further below.
Figure 5:
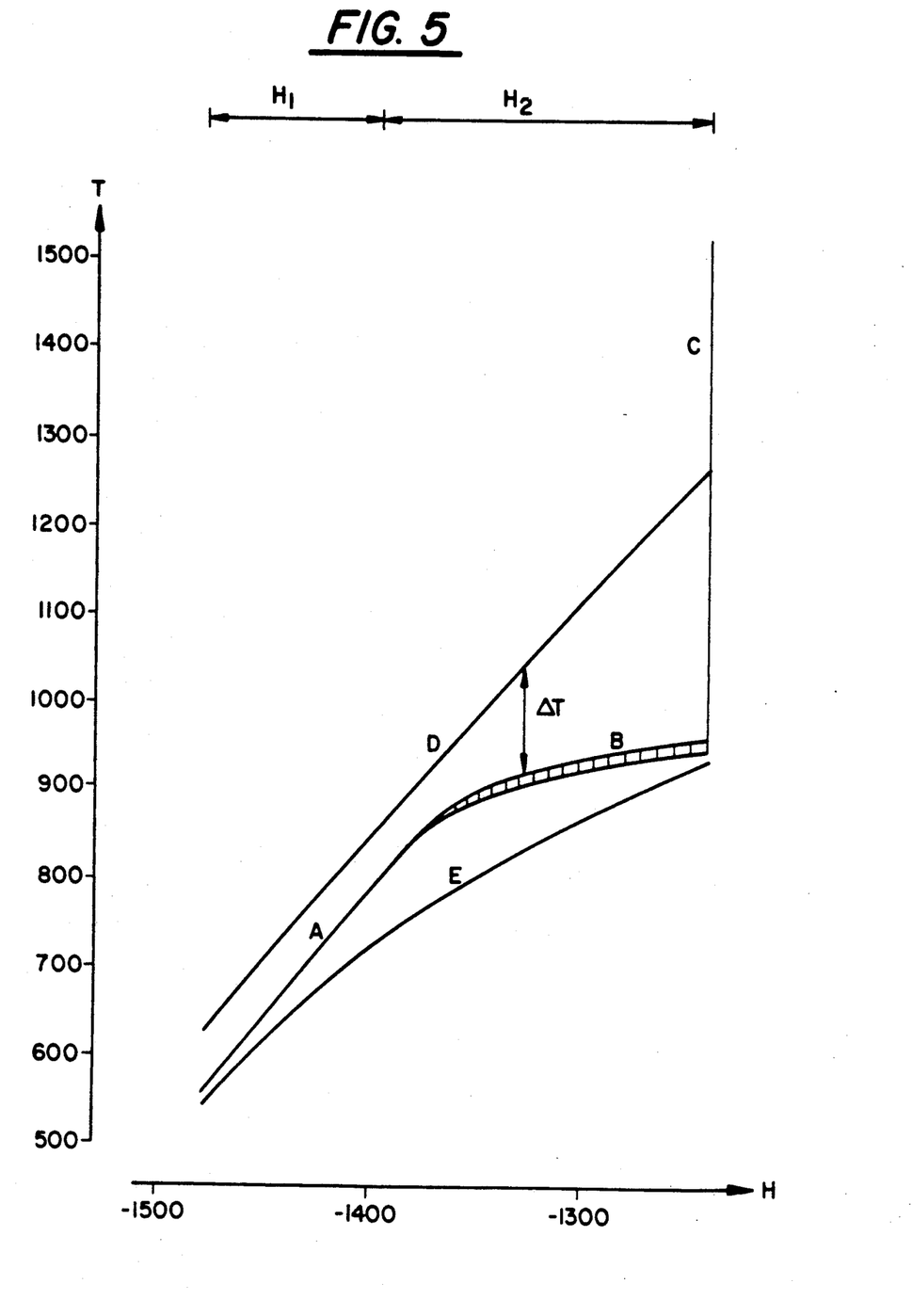
Figure 6:
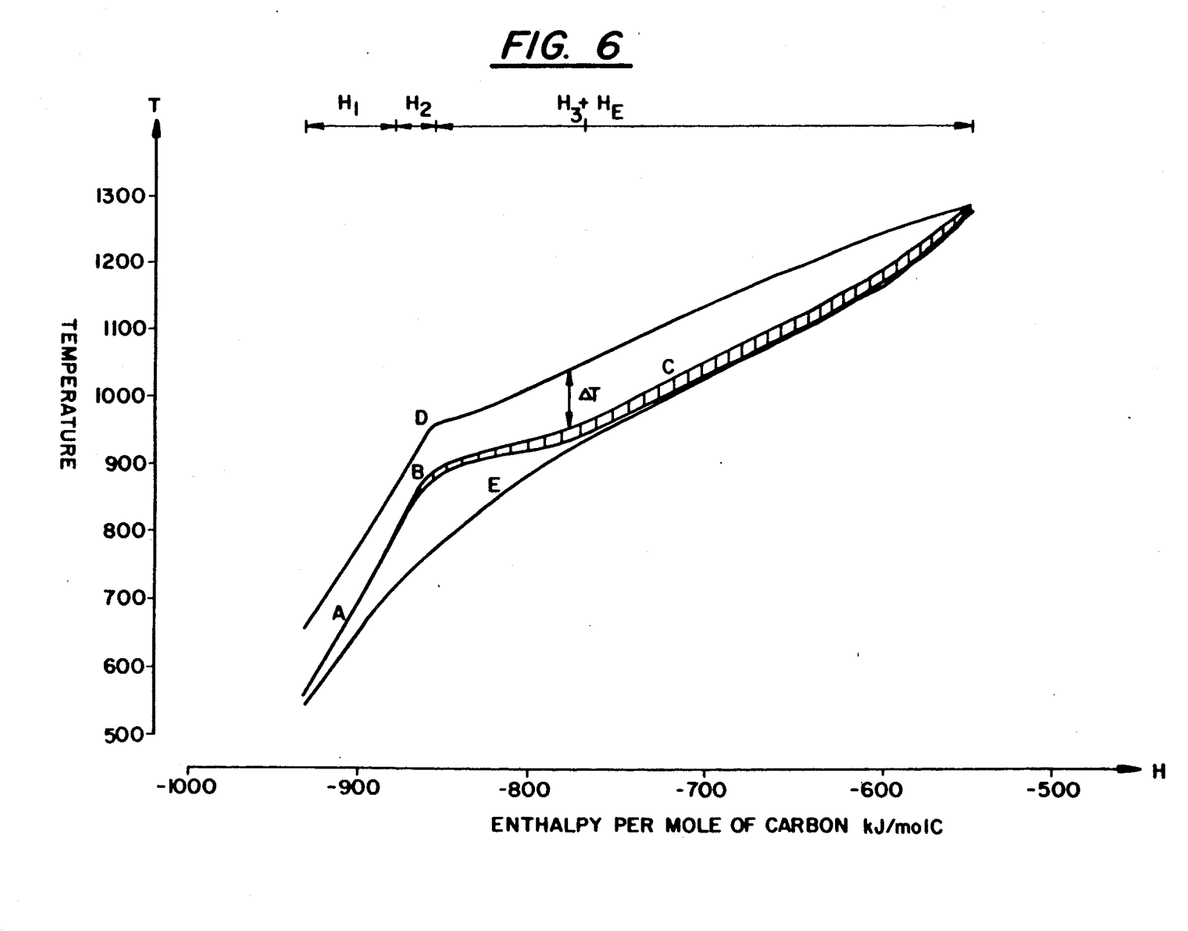

In FIGS. 4 to 6 important thermodynamic relations of the process for producing hydrogen-rich gas utilizing the inventive steam reformers are given. FIG. 4 illustrates the process in the apparatus according to FIG. 1 with air, FIG. 5 the same process with oxygen. FIG. 6 illustrates the process carried out in the apparatus according to FIG. 2.

In the following tables I to III which are to be read in connection with the FIGS. 4 to 6 the abbreviations stand for the following units:

T is the temperature axis (K),
H the enthalpy axis (kJ/mol),
$H_1$ is the enthalpy recovered by heat exchange,
$H_2$ is the enthalpy recovered by heat exchange plus conversion and
$H_3$ the enthalpy recovered during the internal heating,
$H_E$ is the enthalpy added by electrical heating,
$\Delta T$ is the temperature interval effective for the heat exchange between the two media,
A is the heating curve of the feed substances by heat exchange alone,
B the curve obtained by heat exchange plus (endothermic!) conversion and
C the curve obtained by heat exchange, conversion plus internal heating.
10 is the equivalence line, indicating the relation between the temperature and the enthalpy of the gases, when in chemical reaction equilibrium.

The following Table I shows special values of the representation in FIG. 4 (air).

TABLE I

1. Process along curve A
Heating of the feed substances by heat recovery.

| | | In the tubes Reaction products | | Outside the tubes Feed substances | |
|---|---|---|---|---|---|
| | Units | Inflow | Outflow | Inflow | Outflow |
| Data concerning fluid | | | | | |
| Mean molecular weight | g/mol | 17,4 | 17,4 | 17,7 | 17,7 |
| Pressure | bar | 30,05 | 30,0 | 31,4 | 31,3 |
| Temperature | K | 850 | 625 | 560 | 800 |
| Specific mass | kg/m³ | 7,38 | | 12,8 | 8,38 |
| Isobaric heat capacity | J/(mol K) | 36,4 | 35,4 | 46,2 | 43,7 |
| Dynamic Viscosity | mg/(s m) | 33,9 | 25,6 | 19,8 | 28,8 |
| Heat conductivity | mW/(K m) | 122 | 92,8 | 54,0 | 82,6 |
| Prandtl-No. | — | 0,581 | 0,563 | 0,958 | 0,860 |
| Data concerning flow of mass | | | | | |
| Mass velocity | kg/s | 0,89 | | 0,58 | |
| Volume velocity | m³/s | 0,121 | 0,088 | 0,045 | 0,069 |
| Heat flow | kW | | 420 | | |
| Heat flow density | kW/m² | 16 | | 11 | |
| Reynolds-No. | — | 17200 | 22700 | 17800 | 12200 |
| Pressure drop | mbar | 50 | | 100 | |

2. Process along curve B
Reforming with heat addition alone by heat recovery

| | | In the tubes Reaction products | | Outside the tubes Feed substances | |
|---|---|---|---|---|---|
| | Units | Inflow | Outflow | Inflow | Outflow |
| Data concerning fluid | | | | | |
| Mean molecular weight | g/mol | 17,4 | 17,4 | 17,7 | 15,5 |
| Pressure | bar | 30,1 | 30,05 | 31,3 | 30,8 |
| Temperature | K | 1228 | 850 | 800 | 950 |
| Specific mass | kg/m³ | 5,10 | 7,38 | 8,38 | 6,05 |
| Isobaric heat capacity | J/(mol K) | 39,4 | 36,4 | 43,7 | 41,2 |
| Dynamic Viscosity | mg/(s m) | 45,2 | 33,9 | 28,8 | 35,1 |
| Heat conductivity | mW/(K m) | 166 | 122 | 82,8 | 144 |
| Prandtl-No. | — | 0,618 | 0,581 | 0,859 | 0,646 |
| Data concerning flow of mass | | | | | |
| Mass velocity | kg/s | 0,89 | | 0,58 | |
| Volume velocity | m³/s | 0,175 | 0,121 | 0,069 | 0,096 |
| Heat flow | kW | | 730 | | |
| Heat flow density | kW/m² | 40 | | 28 | |
| Reynolds-No. | — | 12900 | 17200 | 12200 | 10000 |
| Pressure drop | mbar | 50 | | 500 | |

3. Process along curve A and B
Heating of air by heat recovery

| | | In the tubes Air | |
|---|---|---|---|
| | Units | Inflow | Outflow |
| Data concerning fluid | | | |
| Mean molecular weight | g/mol | 28,85 | 28,85 |
| Pressure | bar | 31,0 | 30,8 |
| Temperature | K | 400 | 900 |
| Specific mass | kg/m³ | 27,2 | 11,9 |

TABLE I-continued

|  | | | |
|---|---|---|---|
| Isobaric heat capacity | J/(mol K) | 29,1 | 30,1 |
| Dynamic viscosity | mg/(s m) | 23,0 | 40,1 |
| Heat conductivity | mW/(K m) | 32,9 | 60,2 |
| Prandtl-No. | — | 0,71 | 0,75 |
| Data concerning flow of mass | | | |
| Mass velocity | kg/s | 0,31 | |
| Volume velocity | m³/s | 0,011 | 0,026 |
| Heat flow | kW | 166 | |
| Heat flow density | kW/m² | 14 | |
| Reynolds-No. | — | 26300 | 15600 |
| Pressure drop | mbar | 200 | |

The following Table II shows special values of the representation in FIG. 5 (oxygen)

TABLE II

1. Process along curve A
Heating of the feed substances by heat recovery.

|  | | In the tubes Reaction products | | Outside the tubes Feed substances | |
|---|---|---|---|---|---|
|  | Units | Inflow | Outflow | Inflow | Outflow |
| Data concerning fluid | | | | | |
| Mean molecular weight | g/mol | 15,5 | 15,5 | 17,8 | 17,8 |
| Pressure | bar | 30,05 | 30,0 | 31,4 | 31,3 |
| Temperature | K | 850 | 625 | 560 | 800 |
| Specific mass | kg/m³ | 6,60 | 9,11 | 12,8 | 8,52 |
| Isobaric heat capacity | J/(mol K) | 37,7 | 37,1 | 46,2 | 43,3 |
| Dynamic viscosity | mg/(s m) | 32,5 | 23,9 | 19,9 | 28,9 |
| Heat conductivity | mW/(K m) | 133 | 99,2 | 53,1 | 81,3 |
| Prandtl-No. | — | 0,594 | 0,576 | 0,975 | 0,868 |
| Data concerning flow of mass | | | | | |
| Mass velocity | kg/s | 0,75 | | 0,68 | |
| Volume velocity | m³/s | 0,112 | 0,081 | 0,053 | 0,080 |
| Heat flow | kW | 407 | | | |
| Heat flow density | kW/m² | 17 | | 12 | |
| Reynolds-No. | — | 14900 | 20200 | 20700 | 14300 |
| Pressure drop | mbar | 50 | | 100 | |

2. Process along curve B
Reforming with heat addition alone by heat recovery

|  | | In the tubes Reaction products | | Outside the tubes Feed substances | |
|---|---|---|---|---|---|
|  | Units | Inflow | Outflow | Inflow | Outflow |
| Data concerning fluid | | | | | |
| Mean molecular weight | g/mol | 15,5 | 15,5 | 17,8 | 15,6 |
| Pressure | bar | 30,1 | 30,05 | 31,3 | 30,8 |
| Temperature | K | 1263 | 850 | 800 | 950 |
| Specific mass | kg/m³ | 4,40 | 6,59 | 8,51 | 6,13 |
| Isobaric heat capacity | J/(mol K) | 41,2 | 37,7 | 43,3 | 40,9 |
| Dynamic viscosity | mg/(s m) | 45,2 | 32,5 | 28,9 | 35,2 |
| Heat conductivity | mW/(K m) | 188 | 133 | 81,4 | 142 |
| Prandtl-No. | — | 0,640 | 0,594 | 0,867 | 0,652 |
| Data concerning flow of mass | | | | | |
| Mass velocity | kg/s | 0,75 | | 0,68 | |
| Volume velocity | m³/s | 0,167 | 0,112 | 0,080 | 0,112 |
| Heat flow | kW | 765 | | | |
| Heat flow density | kW/m² | 50 | | 35 | |
| Reynolds-No. | — | 10600 | 14900 | 14300 | 11700 |
| Pressure drop | mbar | 50 | | 500 | |

3. Process along curve A and B
Heating of oxygen by heat recovery

|  | | In the tubes Oxygen | |
|---|---|---|---|
|  | Units | Inflow | Outflow |
| Data concerning fluid | | | |

TABLE II-continued

|  |  |  |  |
|---|---|---|---|
| Mean molecular weight | g/mol | 32 | 32 |
| Pressure | bar | 31 | 30,8 |
| Temperature | K | 400 | 900 |
| Specific mass | kg/m³ | 30,2 | 13,2 |
| Isobaric heat capacity | J/(mol K) | 30,1 | 34,4 |
| Dynamic viscosity | mg/(s m) | 25,8 | 44,7 |
| Heat conductivity | mW/(K m) | 34,2 | 66,1 |
| Prandtl-No. | — | 0,711 | 0,723 |
| *Data concerning flow of mass* | | | |
| Mass velocity | kg/s | 0,07 | |
| Volume velocity | m³/s | 0,002 | 0,005 |
| Heat flow | kW | 37 | |
| Heat flow density | kW/m² | 2,0 | |
| Reynolds-No. | — | 4900 | 2900 |
| Pressure drop | mbar | 200 | |

The following Table III shows special values of the representation in FIG. 6 (electrical heating)

TABLE III

|  | Units | In the tubes Reaction products Inflow | In the tubes Reaction products Outflow | Outside the tubes Feed substances Inflow | Outside the tubes Feed substances Outflow |
|---|---|---|---|---|---|
| 1. Process along curve A <br> *Heating of the feed substances by heat recovery.* | | | | | |
| *Data concerning fluid* | | | | | |
| Mean molecular weight | g/mol | 12,7 | 12,7 | 17,6 | 17,6 |
| Pressure | bar | 30,2 | 30,0 | 31,4 | 31,0 |
| Temperature | K | 870 | 650 | 560 | 800 |
| Specific mass | kg/m³ | 5,26 | 7,02 | 12,6 | 8,3 |
| Isobaric heat capacity | J/(mol K) | 35,3 | 34,2 | 46,0 | 44,2 |
| Dynamic viscosity | mg(s m) | 32,9 | 25,2 | 19,8 | 27,1 |
| Heat conductivity | mW/(K m) | 180 | 140,2 | 55,9 | 80,7 |
| Prandtl-No. | — | 0,510 | 0,486 | 0,925 | 0,842 |
| *Data concerning flow of mass* | | | | | |
| Mass velocity | kg/s | 0,58 | | 0,58 | |
| Volume velocity | m³/s | 0,110 | 0,083 | 0,046 | 0,069 |
| Heat flow | kW | 350 | | | |
| Heat flow density | kW/m² | 21,1 | | 14,8 | |
| Reynolds-No. | — | 11500 | 15100 | 17700 | 12900 |
| Pressure drop | mbar | 40 | | 50 | |
| 2. Process along curve B <br> *Reforming with heat addition alone by heat recovery* | | | | | |
| *Data concerning fluid* | | | | | |
| Mean molecular weight | g/mol | 12,7 | 12,7 | 17,6 | 17,5 |
| Pressure | bar | 30,3 | 30,2 | 31,0 | 30,0 |
| Temperature | K | 940 | 870 | 800 | 870 |
| Specific mass | kg/m³ | 4,88 | 5,26 | 8,33 | 7,57 |
| Isobaric heat capacity | J/(mol K) | 35,7 | 35,3 | 44,2 | 45,7 |
| Dynamic viscosity | mg/(s m) | 35,2 | 32,9 | 27,1 | 31,1 |
| Heat conductivity | mW/(K m) | 192 | 180 | 80,7 | 95,8 |
| Prandtl-No. | — | 0,517 | 0,510 | 0,986 | 0,991 |
| *Data concerning flow of mass* | | | | | |
| Mass velocity | kg/s | 0,58 | | 0,58 | |
| Volume velocity | m³/s | 0,119 | 0,110 | 0,069 | 0,077 |
| Heat flow | kW | 116 | | | |
| Heat flow density | kW/m² | 21,0 | | 14,7 | |
| Reynolds-No. | — | 10800 | 11500 | 12900 | 11300 |
| Pressure drop | mbar | 40 | | 200 | |
| 3. Process along curve C <br> *Reforming by heating with heat recovery and electrical heating* | | | | | |
| *Data concerning fluid* | | | | | |
| Mean molecular weight | g/mol | 12,7 | 12,7 | 17,6 | 12,7 |
| Pressure | bar | 30,6 | 30,3 | 30,9 | 30,6 |
| Temperature | K | 1285 | 940 | 870 | 1285 |
| Specific mass | kg/m³ | 3,60 | 4,88 | 7,57 | 3,60 |
| Isobaric heat capacity | J/(mol K) | 38,2 | 35,7 | 45,7 | 38,2 |

TABLE III-continued

|  | Units | In the tubes Reaction products | | Outside the tubes Feed substances | |
| --- | --- | --- | --- | --- | --- |
|  |  | Inflow | Outflow | Inflow | Outflow |
| Dynamic viscosity | mg/(s m) | 44,6 | 35,2 | 31,1 | 44,6 |
| Heat conductivity | mW/(K m) | 248 | 192 | 95,8 | 248 |
| Prandtl-No. | — | 0,543 | 0,517 | 0,843 | 0,543 |
| Data concerning flow of mass |  |  |  |  |  |
| Mass velocity | kg/s | 0,58 | | 0,58 | |
| Volume velocity | m³/s | 0,161 | 0,119 | 0,077 | 0,161 |
| Heat flow | kW | | 585 | | |
| Heat flow density | kW/m² | 28,9 | | 20,2 | |
| Reynolds-No. | — | 8500 | 10800 | 11300 | 7900 |
| Pressure drop | mbar | 60 | | 350 | |

For the expert, the deduction of the corresponding data for processes carried out in the apparatus according to FIG. 3 is now, based on the above, an easy task.

I claim:

1. An apparatus for endothermic catalytic reactions of gases at high temperature and pressure comprising:
   (a) a pressure vessel having a gas inlet means at one end of said vessel for the introduction of feed substances, a second gas inlet means near an opposite end of said vessel for the introduction of an oxygen-containing gas, and a gas outlet at said opposite end of said vessel for removing gaseous reaction products;
   (b) an inner thermal isolating hull open at one end and positioned within said vessel so as to provide a confined path between an inner wall of said vessel and an outer wall of said inner thermal isolating hull extending substantially throughout the length of said vessel for conveying said feed substances from said gas inlet to the open end of the hull;
   (c) a tube bundle heat exchanger disposed within said inner thermal isolating hull extending from said open end of said hull toward a closed end of said hull, said heat exchanger having tubes in open communication with said gas outlet and gaseous reaction products formed near the closed end of the hull, and having tubes in closed communication with said gas inlet means for oxygen-containing gas;
   (d) a mixing chamber with a burner defining a heating means disposed between an end of said heat exchanger and said closed end of said hull wherein partially reacted feed substances and said oxygen-containing gases enter and are combusted forming said gaseous reaction products in the presence of a second block of catalytic material heat energy is supplied to said gaseous reaction products where said gaseous reaction products enter said tubes and exit through said gas outlet;
   (e) a first block of catalytic material disposed between said tubes of said tube bundle heat exchanger and said hull, wherein said feed substances flow around said tubes of said tube bundle heat exchanger and through said first block of catalytic material; and
   (f) a second block of catalytic material disposed near said closed end of said hull wherein said gaseous reaction products exiting from said mixing chamber are allowed to reach thermodynamic equilibrium.

2. An apparatus according to claim 1, wherein said second block of catalytic material is arranged in two block portions and said burner is positioned between the two block portions.

3. An apparatus according to claim 1, wherein said burner comprises an electrical heating element, wherein said burner is arranged in a lower portion of said first block of catalytic material and outside of said tubes of said tube bundle heat exchanger.

4. An apparatus according to claim 1, wherein said inner isolating hull is made of a material which consists of a metallic or a ceramic material.

5. An apparatus as in claim 3, wherein said first block of catalytic material is arranged in baskets and said electrical heating element is arranged in the lower portion of said first block of catalytic material and said apparatus furhter comprises means for introducing oxygen into sai partially reacted feed substances exiting from said first catalyst block.

* * * * *